United States Patent
Kusunoki et al.

(10) Patent No.: US 6,938,449 B2
(45) Date of Patent: Sep. 6, 2005

(54) HYDRAULIC FORMING PROCESS, HYDRAULIC FORMING DEVICE AND METAL SEPARATOR FOR A FUEL CELL FORMED BY HYDRAULIC FORMING PROCESS

(75) Inventors: Kenichi Kusunoki, Toyota (JP); Masanao Shiomi, Toyota (JP); Naoki Yoshioka, Okazaki (JP)

(73) Assignee: Araco Kabushiki Kaisha (JP)

( * ) Notice: Subject to any disclaimer, the term of this patent is extended or adjusted under 35 U.S.C. 154(b) by 10 days.

(21) Appl. No.: 10/687,412

(22) Filed: Oct. 15, 2003

(65) Prior Publication Data

US 2004/0079128 A1 Apr. 29, 2004

(30) Foreign Application Priority Data

Oct. 23, 2002 (JP) .................................. 2002-308279
Jun. 24, 2003 (JP) .................................. 2003-178935

(51) Int. Cl.$^7$ .......................... B21D 39/08; H01M 2/00; H01M 4/86
(52) U.S. Cl. ............................................. 72/57
(58) Field of Search ..................... 429/34, 41; 72/57, 72/60, 63

(56) References Cited

U.S. PATENT DOCUMENTS

| | | | |
|---|---|---|---|
| 3,286,496 A | | 11/1966 | Burk |
| 4,794,774 A | * | 1/1989 | Clark et al. ................... 72/63 |
| 6,365,295 B1 | * | 4/2002 | Matsukawa et al. .......... 429/34 |
| 6,372,376 B1 | * | 4/2002 | Fronk et al. .................. 429/41 |
| 6,383,678 B1 | * | 5/2002 | Kaneko et al. ............... 429/34 |
| 2001/0023603 A1 | * | 9/2001 | Yoshioka et al. ............. 72/57 |

FOREIGN PATENT DOCUMENTS

| | | |
|---|---|---|
| DE | 1 240 801 | 5/1967 |
| DE | 4436436 | * 5/1996 |
| DE | 19717953 | * 10/1998 |
| DE | 100 27 079 | 12/2001 |
| EP | 1 136 149 | 9/2001 |
| JP | 08-224621 A | 9/1996 |
| JP | 2001-259752 A | 9/2001 |
| JP | 2002-102949 | 5/2002 |

* cited by examiner

Primary Examiner—David Jones
(74) Attorney, Agent, or Firm—Fish & Richardson P.C.

(57) ABSTRACT

By using a hydraulic forming device 20, a metal plate body 11 is placed on a support section 21b with a hollow section 21a formed on a lower die 21 filled with hydraulic fluid A. Subsequently, a blank holder 23 is lowered to clamp the peripheral edge section of the placed metal plate body 11 with the support section 21b. Then, the upper die 22 is lowered relative to the lower die 21 to pressedly deform the central section of the metal plate body 11 and to compress the hydraulic fluid A to increase the fluid pressure. A rib-like convex section 12 is transferred onto the metal plate body 11 by the increased fluid pressure of the hydraulic fluid A and a formed section 22a. Further, the fluid pressure of the hydraulic fluid A is kept for a predetermined time. Then, the increased fluid pressure of the hydraulic fluid A is released.

8 Claims, 11 Drawing Sheets

HYDRAULIC FORMING PROCESS, HYDRAULIC FORMING DEVICE AND METAL SEPARATOR FOR A FUEL CELL FORMED BY HYDRAULIC FORMING PROCESS

BACKGROUND OF THE INVENTION

1. Field of the Invention

The present invention relates to a hydraulic forming process for performing a hydraulic forming by increasing fluid pressure of fluid filled in a sealed space without using a complicated device, and a device for this process as well as a metal separator for a fuel cell having convex sections formed by the hydraulic forming process.

2. Description of the Prior Arts

A hydraulic forming process disclosed, for example, in the following patent document 1 has conventionally been well-known. In this conventional hydraulic forming process, a blank holder firstly clamps a thin metal plate with fluid filled in a hollow section formed at a lower die. Then, an upper die having formed thereon a plurality of concave sections is lowered and fluid pressure is raised by a pressure pump, thereby preforming on the thin metal plate convex sections projecting into the concave sections formed on the upper die. Subsequently, the fluid pressure is decreased and the upper die is lowered to a predetermined position for clamping the thin metal plate between the concave sections on the upper die and the convex sections on the lower die, whereby predetermined convex shapes are transferred onto the thin metal plate by a pressing. Then, a hydraulic valve is completely opened to decrease the fluid pressure, so that the upper die rises to return to the original position. In this way, the execution of the above-mentioned processes can form a plurality of concavo-convex shapes on the surface of the thin metal plate according to the conventional hydraulic forming process. This conventional hydraulic forming process is applied to a metal separator for a fuel cell having formed thereon a plurality of concavo-convex shapes in an embodiment of the invention.

[Patent Document 1]

Japanese Unexamined Patent Application No. 2001-259752

However, the conventional hydraulic forming process requires to increase the fluid pressure by the pressure pump upon preforming the thin metal plate. Therefore, the pressure pump has to be provided at the hydraulic forming device, that makes the overall construction of the hydraulic forming device complicated and expensive.

SUMMARY OF THE INVENTION

The present invention is accomplished for coping with the aforesaid problem, and aims to provide a hydraulic forming process and hydraulic forming device that enable a hydraulic forming with a simplified die structure, and in particular, that are preferable for forming a plurality of concavo-convex shapes on a thin metal plate such as a metal separator for a fuel cell.

The feature of the present invention is that fluid is sealedly filled at one side of a workpiece interposed between a movable die and a fixed die and the pressure of the fluid is increased by pressing down the movable die toward an accommodating section of the fluid, whereby a part of the workpiece is deformed toward a forming space section formed at the other side of the workpiece to thereby perform a forming on the workpiece. According to this, the fluid can be compressed to be pressurized by pressing down the movable die toward the accommodating section of the fluid of the workpiece. Therefore, a pressure pump for pressurizing the fluid is unnecessary, thereby being capable of simplifying the die structure.

Another feature of the present invention is a hydraulic forming process for forming a convex section at a central section of a plate-like workpiece that is interposed between an upper die and a lower die with its peripheral edge section clamped, comprising a first step for placing the workpiece on the top end section of the lower die with a hollow section formed on the lower die filled with fluid so as to prevent air from entering, a second step for lowering a blank holder arranged at the outer periphery of the upper die so as to clamp the peripheral edge section of the workpiece placed on the lower die by the blank holder and the top end section of the lower die and a third step for lowering the upper die relative to the lower die for pressedly deforming the central section of the workpiece as well as for compressing the fluid to increase its pressure, thereby transferring a shape of a formed section formed on the upper die on the workpiece by the fluid having the increased pressure for forming the convex section. In this case, a fourth step may be provided at the third step for maintaining the upper die to thereby keep the fluid pressure of the fluid for a predetermined time after the shape of the formed section on the upper die is transferred onto the workpiece. Further, a fifth step may be provided at the fourth step for releasing the fluid pressure of the fluid after the upper die is maintained to thereby keep the fluid pressure of the fluid for the predetermined time.

According to this, the upper die is relatively lowered to pressedly deform the workpiece placed on the top end section of the lower die, and further, to compress the fluid filled in the hollow section formed at the lower die to increase the pressure, whereby the fluid pressure of the fluid can be increased. This enables to easily perform a processing with a high fluid pressure without additionally providing a pressure pump. Further, the formed section formed on the upper die and the fluid having the increased fluid pressure can form a predetermined shape on the workpiece. Therefore, a process for increasing and reducing the fluid pressure and a pressing process with the upper die and the lower die can be eliminated compared to the conventional case for forming a predetermined shape on the workpiece by the formed section on the upper die and the formed section on the lower die. Accordingly, a time required for processing (one cycle time) can be shortened.

Moreover, the fluid pressure of the fluid can be kept for the predetermined time after forming the predetermined shape on the workpiece. This enables to uniformly exert the high fluid pressure on the bottom surface of the workpiece for the predetermined time, thereby, for example, being capable of eliminating the distortion caused with the forming. Therefore, a process for eliminating the distortion can be omitted, thereby being capable of shortening the processing time.

Further, the fluid pressure of the fluid can be released after the fluid pressure of the fluid is kept for the predetermined time. According to this, the predetermined shape (for example, concave-convex shape) formed on the workpiece is prevented to be deformed due to the high fluid pressure exerted on the bottom surface of the workpiece after the upper die rises, thereby being capable of enhancing a forming precision.

In these cases, the compression ratio of the fluid can be not more than $3.0 \times 10^{-5}$ cm$^2$/kg. Further, the viscosity of the fluid can be 100 to 1500 cSt. Moreover, the fluid can be a mixture of glycol and water at a predetermined ratio. Additionally, the workpiece can be formed such that one side thereof is surface-treated and the same side comes in contact with the fluid.

According to these, the fluid pressure of the fluid can further efficiently be increased by the compression ratio of the fluid not more than $3.0 \times 10^{-5}$ cm$^2$/kg. Therefore, the construction of the hydraulic forming device can be simplified, thereby being capable of reducing the manufacturing cost of this device. Moreover, the viscosity of the fluid in the range of 100 to 1500 cSt can prevent, for example, the leakage of the fluid from between the workpiece and the top end section of the lower die even if the fluid pressure becomes high. According to this, the fluid pressure of the fluid can further be increased to perform the forming, whereby the shape of the formed section on the upper die can exactly be transferred to thereby be capable of enhancing the forming precision. Further, the fluid can be prepared by mixing glycol and water than can easily be got, whereby fluid having low compression and high viscosity can easily be prepared. Moreover, the fluid having low compression and high viscosity can be prepared, so that the fluid pressure can easily be increased even if the compression of the fluid is low, thereby being capable of reducing a stroke of the movable die or the upper die.

Further, the one side of the formed section on the workpiece comes only in contact with the fluid, thereby preventing the surface that is in contact with the fluid from being damaged by the contact with the die (metal). Therefore, even if the surface treatment (for example, plating or the like) is performed at the one side of the workpiece before the hydraulic forming, the forming can preferably be executed without giving adverse effect (for example, separation of the plating) on the surface treatment since the forming is performed with the surface-treated side brought into contact with the fluid. Moreover, the forming is performed with the one side of the workpiece brought into contact with the fluid, so that a processing force is uniformly exerted on the formed section. This enables to increase the expansion of the workpiece plate, whereby even a thin plate having a thickness of not more than 1 mm can easily be formed.

Further, viewed the feature of the present invention from another angle, a hydraulic forming device comprises a support section that can support a workpiece placed thereon, a lower die having a hollow section enclosed by the support section and filled with fluid, a blank holder that can be moved upwardly and downwardly and can clamp a peripheral edge section of the workpiece with the support section of the lower die and an upper die that can be moved upwardly and downwardly, has a formed section at its bottom surface and can get into the hollow section of the lower die with the central section of the workpiece having the peripheral edge section clamped by the support section of the lower die and the blank holder.

In this case, a supplying/exhausting/sealing device may be provided that supplies the fluid to the hollow section of the lower die to fill the same before the workpiece is placed on the support section of the lower die, seals the fluid filled in the hollow section when the workpiece is formed by the upper die and the lower die and discharges the fluid from the hollow section before the upper die is withdrawn from the hollow section of the lower die after the forming. Further, the supplying/exhausting/sealing device may be provided with a composite valve composed of a check valve that allows the flow of the fluid from a hydraulic supply source to the hollow section of the lower die and a relief valve that can change a pressure retainable in a path between the hollow section of the lower die and the check valve according to a change-over operation and has a relief pressure set low in a normal state while a relief pressure set high when the workpiece is formed, wherein a valve body of this composite valve may be directly installed to the lower die. Moreover, the valve body may be provided with a mounting port to which a pressure sensor can be mounted. Additionally, the workpiece may have one surface having a surface treatment performed thereon and may be placed on the support section of the lower die with the same surface brought into contact with the fluid.

According to these, the upper die is relatively lowered to pressedly deform the workpiece placed on the top end section of the lower die, and further, to compress the fluid filled in the hollow section formed at the lower die to increase the pressure, whereby the fluid pressure of the fluid can be increased. This enables to easily perform a processing with a high fluid pressure without additionally providing a pressure pump. Further, the formed section formed on the upper die and the fluid having the increased fluid pressure can form a predetermined shape on the workpiece. Therefore, a process for increasing and reducing the fluid pressure and a pressing process with the upper die and the lower die can be eliminated compared to the conventional case for forming a predetermined shape on the workpiece by the formed section on the upper die and the formed section on the lower die. Accordingly, a time required for processing (one cycle time) can be shortened.

Further, the hydraulic forming device can be provided with the supplying/exhausting/sealing device, whereby fluid can easily be replenished in case where the fluid is decreased due to, for example, the continuous forming. Moreover, the fluid pressure can be retained for a predetermined time after a predetermined shape is formed on the workpiece since the fluid can be sealed. According to this, high fluid pressure can uniformly be exerted on the bottom surface of the workpiece for a predetermined time, thereby being capable of eliminating a distortion produced with the forming, for example. Consequently, a process for eliminating the distortion can be omitted to thereby be capable of shortening a processing time. Further, the fluid pressure can be released before the upper die is withdrawn from the hollow section, so that the deformation of the workpiece caused by the high fluid pressure can be prevented after the upper die is withdrawn, thereby being capable of enhancing a forming precision of a product.

Moreover, the supplying/exhausting/sealing device is provided with the composite valve composed of the check valve and the relief valve, wherein the valve body of the composite valve is directly installed to the lower die. Therefore, it is unnecessary to provide a communicating pipe line for establishing communication between the hollow section of the lower die and each valve. Therefore, pressure drop due to the enlarged diameter of the communicating pipe line does not occur when the fluid pressure is set high, thereby being capable of maintaining the fluid pressure high. Moreover, a pressure effect due to the communicating pipe line is not produced to thereby extremely easily increase the fluid pressure even if the compression of the fluid is small, resulting in being capable of decreasing the stroke amount of the upper die (movable die). Additionally, spaces for respectively installing the check valve and the relief valve can be saved, so that the hydraulic forming device can be made compact.

Further, a pressure sensor can be mounted to the mounting port of the valve body of the composite valve. Therefore, a pipe line for mounting the pressure sensor to the lower die is not additionally required, thereby being capable of correctly confirming the fluid pressure in the hollow section without causing a pressure drop. Accordingly, mounting the pressure sensor to the mounting port enables to check whether the forming state of a product is good or not based upon the fluid pressure outputted from the pressure sensor, thereby being capable of keeping the quality of the product satisfactory. Further, the operation amount of the upper die getting into the hollow section can also suitably be adjusted based upon the fluid pressure outputted from the pressure sensor mounted to the mounting port. This enables to form the workpiece with the effect (for example, variation in the thickness or the like) of the shape of the workpiece made minimum, thereby being capable of keeping the quality of the product satisfactory.

Further, the one side of the formed section on the workpiece comes only in contact with the fluid, thereby preventing the surface that is in contact with the fluid from being damaged by the contact with the die (metal). Therefore, even if the surface treatment (for example, plating or the like) is performed at the one side of the workpiece before the hydraulic forming, the forming can preferably be executed without giving adverse effect (for example, separation of the plating) on the surface treatment since the forming is performed with the surface-treated side brought into contact with the fluid. Moreover, the forming is performed with the one side of the workpiece brought into contact with the fluid, so that a processing force is uniformly exerted on the formed section. This enables to increase the expansion of the workpiece plate, whereby even a thin plate having a thickness of not more than 1 mm can easily be formed.

Moreover, viewed other feature of the present invention from another angle, a metal separator for a fuel cell composed by forming a great number of convex sections, wherein the convex sections are formed by a hydraulic forming process comprising a first step for placing a metal separator material on the top end section of the lower die with a hollow section formed on the lower die filled with fluid so as to prevent air from entering, a second step for lowering a blank holder arranged at the outer periphery of the upper die so as to clamp the peripheral edge section of the metal separator material placed on the lower die by the blank holder and the top end section of the lower die and a third step for lowering the upper die relative to the lower die for pressedly deforming the central section of the metal separator material as well as for compressing the fluid to increase its pressure, thereby transferring a shape of a formed section formed on the upper die on the metal separator material by the fluid having the increased pressure for forming a convex section.

In this case, the hydraulic forming process for forming the convex sections may include a fourth step at the third step for maintaining the upper die to thereby keep the fluid pressure of the fluid for a predetermined time after the shape of the formed section on the upper die is transferred onto the metal separator material. Further, the hydraulic forming process for forming the convex sections may include a fifth step at the fourth step for releasing the fluid pressure of the fluid after the upper die is maintained to thereby keep the fluid pressure of the fluid for the predetermined time.

In these cases, the compression ratio of the fluid used for the hydraulic forming process can be not more than $3.0 \times 10^{-5}$ cm$^2$/kg. Further, the viscosity of the fluid used for the hydraulic forming process can be 100 to 1500 cSt. Moreover, the fluid used for the hydraulic forming process can be a mixture of glycol and water at a predetermined ratio. Additionally, the metal separator material can be formed such that one side thereof is surface-treated and the same side comes in contact with the fluid.

According to these, the metal separator for a fuel cell formed by the aforesaid hydraulic forming process has the convex sections transferred with high precision by the formed section of the upper die and the fluid having the increased fluid pressure. Therefore, in case where the metal separator are laminated with each other to form a fuel cell stack, a sufficient joint area can be assured to thereby enhance conductivity between the metal separators. Moreover, the distortion caused upon forming the convex sections can be eliminated, thereby being capable of improving assembility upon assembling the metal separators.

Further, the fuel cell stack is required to be composed by multi-layering the metal separators since electricity of larger capacity is generated, whereby a single cell unit is tend to be great. With respect to this tendency, applying the hydraulic forming process to the fabrication of the metal separator can make the individual metal separator thin, so that it is possible to miniaturize the cell unit. Further, the fuel cell produces water upon generating electricity, which means that the metal separator comes in contact with water for a long time. Therefore, the metal separator is in most cases surface-treated for assuring satisfactory corrosion resistance. The hydraulic forming process of the present invention can effectively prevent the surface of the workpiece from being damaged upon the forming, whereby the surface-treated structure is not damaged to thereby assure an extremely satisfactory corrosion resistance of the metal separator.

DESCRIPTION OF THE PREFERRED EMBODIMENT

A first embodiment of the present invention will be explained hereinbelow with reference to the drawings. FIG. 1 to FIG. 4 show each process according to one embodiment of the present invention for fabricating a thin metal plate having a plurality of rib-like convex sections on its surface, in particular a metal separator for a fuel cell. A hydraulic forming device 20 successively proceeds with each process to fabricate a metal separator 10 composing a fuel cell stack as schematically shown in FIG. 5A in which an essential part is enlarged.

Fabricated two metal separators 10 are joined together at one side with a membrane-electrode assembly (MEA) composed of an anode electrode AE, electrolyte film EF and cathode electrode CE interposed therebetween, to thereby form a fuel cell stack. Two separators 10 are joined at one side via the MEA as described above, resulting in forming a hydrogen gas channel HC through which hydrogen is supplied and an oxygen gas channel OC through which oxygen gas (for example, air) is supplied. Further, the metal separators 10 are directly joined together at the other side to form a cooling water channel CC through which cooling water is supplied.

Figure 5A:
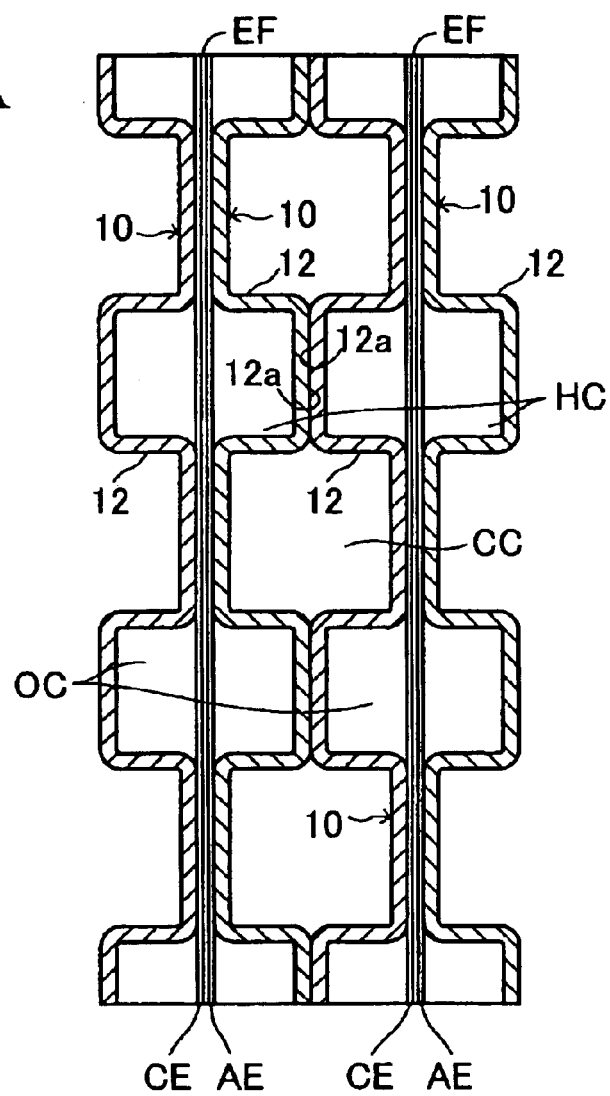
FIG. 5A is a schematic sectional view of an essential part of a fuel cell composed of a metal separator.
Figure 5B:
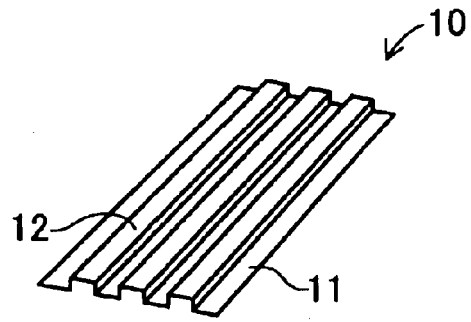
FIG. 5B is a perspective view partially showing a formed section of a metal separator material (workpiece) formed by a process from the first step to the fourth step.

The metal separator 10 has a great number of rib-like convex sections 12 on a surface of a metal plate body 11 as a metal separator material (workpiece) as shown in FIG. 5B. The metal plate body 11 is a stainless (for example, SUS316L) that is like a plate, has no crack or warp and has a characteristic of having no sag at a shoulder section or base section of the rib-like convex section 12. The thickness of the metal plate body 11 is not more than 0.5 mm. In the following detailed explanation of the embodiment, the metal plate body 11 is explained to have a thickness of 0.1 mm. Applicable metal plate body 11 includes other thin stainless plate (SCP, SHP), aluminum plate or copper plate or a metal plate having a surface treatment performed thereon such as a metal plating, painting, attaching a laminate material or the like on these metal plates.

The rib-like convex section 12 has a taper shape slightly widening from its leading edge section toward its base edge section. The rib-like convex section 12 is formed to have a width of 0.5 to 1 mm, a height of 0.4 to 0.6 mm and a pitch of 1 to 2 mm. In the following detailed explanation of this embodiment, the rib-like convex section 12 is supposed to have a width of 0.8 mm, height of 0.5 mm and pitch of 1.6 to 3.0 mm.

The hydraulic forming device 20 is provided with a lower die 21, an upper die 22 and a blank holder 23 as shown in FIG. 1 to FIG. 4.

The lower die 21 is fixed to the top surface of a press head P fixed at its bottom surface to a floor surface and has at approximately central upper section a hollow section 21a that is open to the upward direction. The hollow section 21a is formed to have a size to which the upper die 22 can be inserted and has at its top end section a support section 21b for supporting the metal plate body 11 placed thereon. Further, the hollow section 21a is filled with hydraulic fluid A. The hydraulic fluid A is made by mixing glycol and water. The mixed volume ratio at this time is, for example, such that the glycol to water is about 9~6 to 1~4. The compression ratio of thus made hydraulic fluid A is about $2.84 \times 10^{-5}$ $cm^2/kg$ and its viscosity is about 100 to 1500 cSt. If the viscosity is less than 100 cSt, there may be a possibility that the viscosity lowers to thereby cause a leakage of the fluid from the hollow section 21a when the temperature of the fluid rises upon the forming. On the other hand, the viscosity higher than 1500 cSt may cause a possibility that the fluidity of the fluid cannot be assured.

Moreover, connected to the lower die 21 via an on-off valve S1 is a fluid replenishing device S for replenishing the hydraulic fluid A that is decreased by the forming. A fluid introducing pipe line S2 connected to the on-off valve S1 is open to the bottom surface of the hollow section 21a. The on-off valve S1 is in an off-state to cut the introduction of the hydraulic fluid A when the hydraulic forming device 20 is operated, i.e., the rib-like convex sections 12 are formed on the metal plate body 11. On the other hand, it is in an on-state to release the fluid pressure force before the upper die 22 rises to withdraw after the forming. Further, it is also in the on-state to allow the introduction of the hydraulic fluid A when the hydraulic fluid A is replenished. There may be the case where the hydraulic fluid A has high temperature due to the continuous forming of the metal separator 10. In this case, it is possible to provide a cooling device for cooling the hydraulic fluid A to the fluid replenishing device S for replenishing the cooled hydraulic fluid A to the hollow section 21a.

The upper die 22 is integrally fixed at its top surface to the bottom surface of an inner slider I that can be formed to be capable of being raised and lowered in the axial direction. The outer peripheral size of the upper die 22 is set to a value smaller than the opening size of the hollow section 21a by a predetermined amount. The size smaller by the predetermined amount is a size determined by considering the thickness of the metal plate body 11 and an error thereof that occurs during the manufacturing process. Further, the upper die 22 has formed at the surface opposite to the lower die 21a formed section 22a for forming rib-like convex sections 12 on the metal plate body 11. The formed section 22a has a great number of concavo-convex sections that are formed like a rib for transferring the rib-like convex sections 12 on the metal plate body 11.

The blank holder 23 is integrally fixed at its top surface to a bottom surface of an outer slider O that can be formed to be capable of being raised and lowered in an axial direction, and is positioned at the outer periphery of the upper die 22. The bottom surface of the blank holder 23 is arranged to be opposite to the support section 21b of the lower die 21.

Subsequently, a process for forming a metal separator 10 performed by the hydraulic forming device 20 having the above-mentioned construction from a first step shown in FIG. 1 to a fifth step shown in FIG. 4 will be successively explained in detail from the first step.

Figure 1:
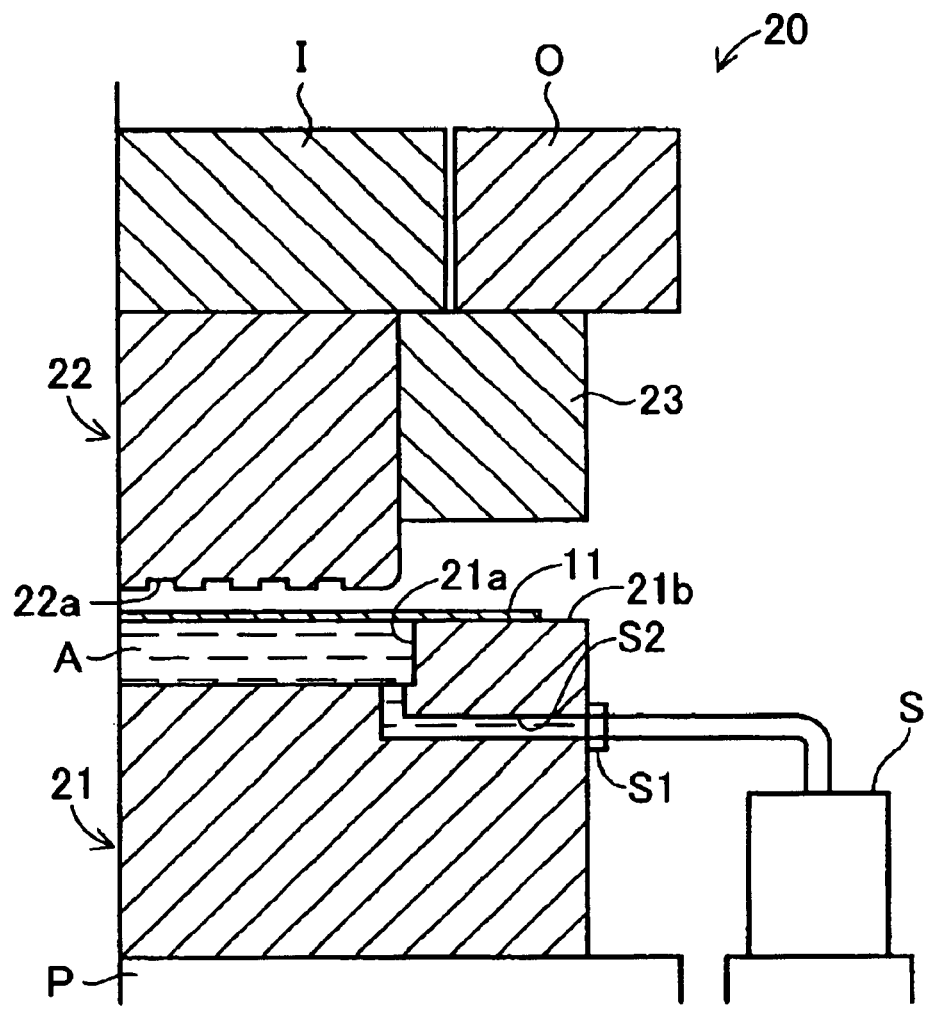
FIG. 1 is a schematic view for explaining a first step executed by a hydraulic forming device according to a first embodiment of the present invention.

At the first step shown in FIG. 1, the metal plate body 11 is placed on the support section 21b with the hydraulic fluid A filled in the hollow section 21a of the lower die 21 up to its top edge section. Care is required so as to prevent air from entering between the fluid surface of the hydraulic fluid A and the metal plate body 11 upon placing the metal plate body 11 as described above. Further, unless the hollow section 21a is filled with the hydraulic fluid A up to its top surface, the fluid replenishing device S is driven as well as the on-off valve S1 is opened for replenishing the hydraulic fluid A. When the hollow section 21a is filled with the hydraulic fluid A up to its top surface, the fluid replenishing device S is stopped and the on-off-valve S1 is closed.

As described above, when the metal plate body 11 is placed on the support section 21b, the hydraulic fluid A fills the space (hereinafter referred to as a sealed space) formed by the bottom surface of the metal plate body 11, the hollow section 21a, the fluid introducing pipe line S2 and the on-off valve S1.

Figure 2:
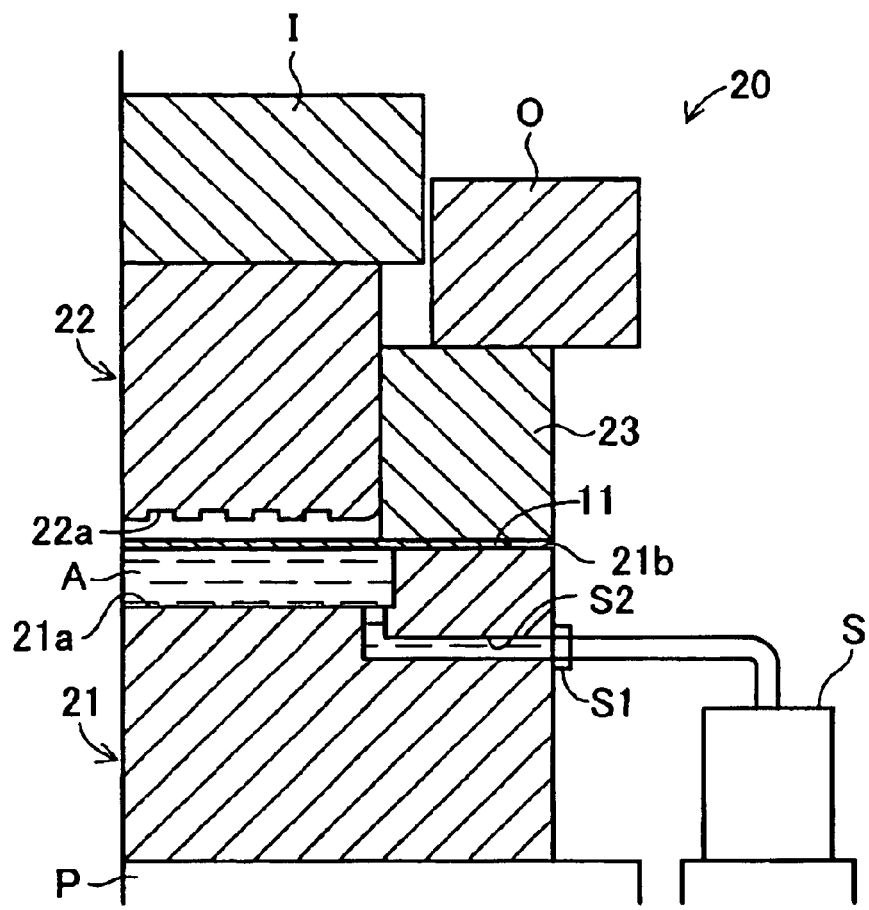
FIG. 2 is a schematic view for explaining a second step executed by the hydraulic forming device according to a first embodiment of the present invention.

At the second step shown in FIG. 2, the outer slider O is lowered to lower the blank holder 23 toward the support section 21b of the lower die 21. Then, the peripheral edge section of the metal plate body 11 placed on the support section 21b of the lower die 21 is clamped by the blank holder 23 and the support section 21b. When the peripheral edge section of the metal plate body 11 is clamped by the blank holder 23 and the support section 21b as described above, the hydraulic fluid A is sealed in the space formed by the bottom surface of the metal plate body 11, the hollow section 21a, the fluid introducing pipe line S2 and the closed on-off valve S1.

Figure 3:
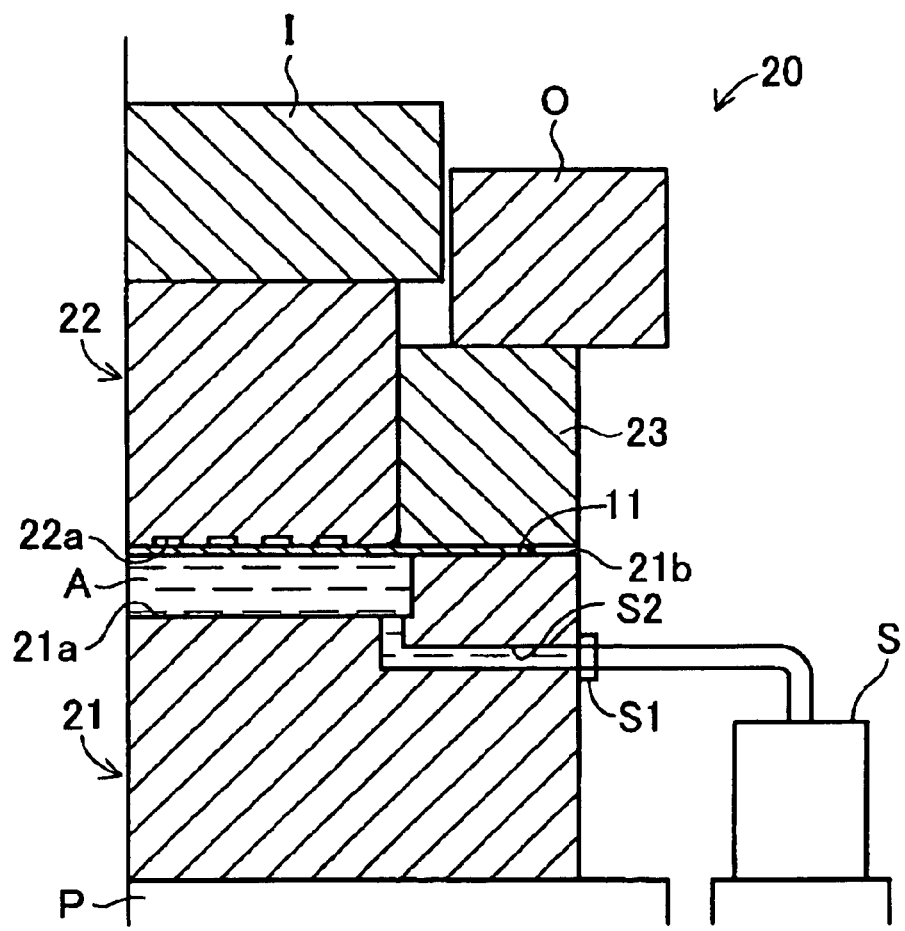
FIG. 3 is a schematic view for explaining a third step executed by the hydraulic forming device according to a first embodiment of the present invention.
Figure 6:
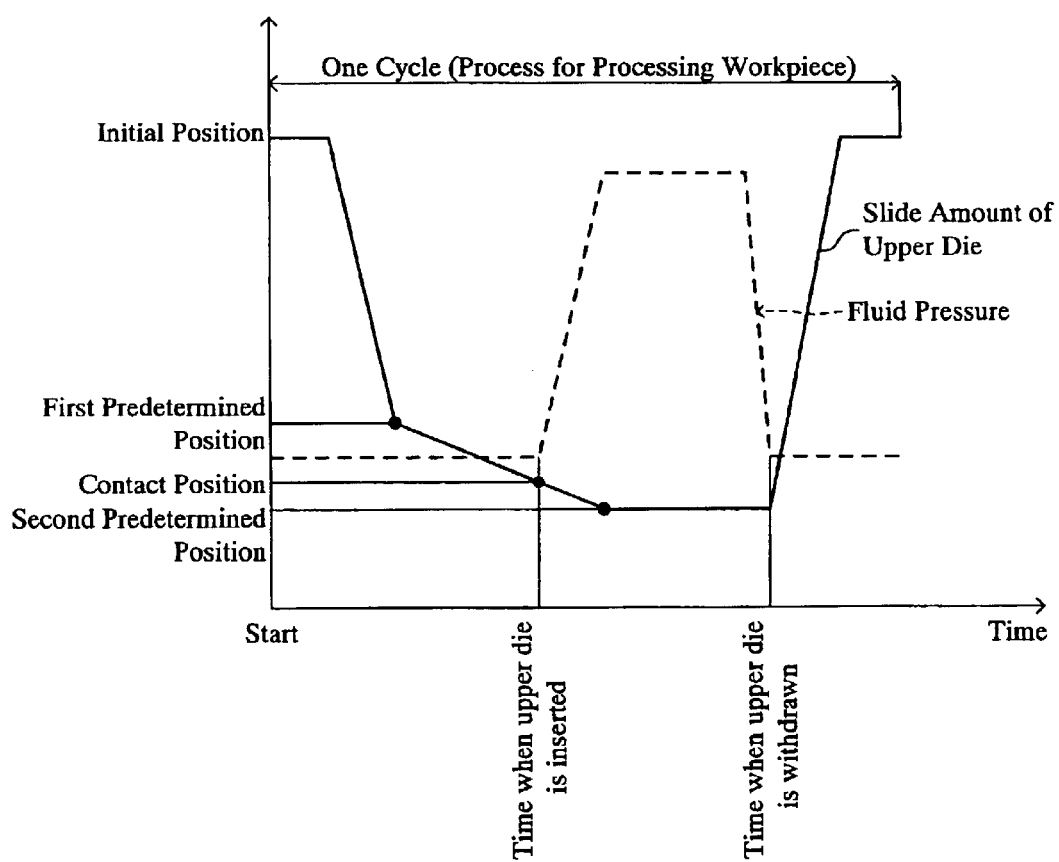
FIG. 6 is a graph schematically showing a slide amount of an upper die and a fluid pressure of hydraulic fluid during a processing (one cycle) of the workpiece.

At the third step shown in FIG. 3, the inner slider I is lowered to lower the upper die 22 toward the hollow section 21a of the lower die 21. Then, the upper die 22 is inserted into the hollow section 21a while pressedly deforming the metal plate body 11. The lowering movement of the upper die 22 is explained in detail based upon a relationship between the slide amount of the upper die 22 and time shown by a solid line in FIG. 6. Firstly, the inner slider I is lowered to lower the upper die 22 from the initial position to a first predetermined position that is in close proximity to the metal plate body 11 with a first slide speed, whereby the formed section 22a of the upper die 22 is brought into a state to be in close proximity to the metal plate body 11.

Subsequently, the inner slider I is further lowered to lower the upper die 22 from the first predetermined position to a second predetermined position that is the lowermost point with a second slide speed lower than the first slide speed. The second predetermined position means here in this embodiment a point where the formed section 22a of the upper die 22 is inserted from the top end section of the support section 21a by approximately 1.2 mm. In this way, the formed section 22a comes in contact with the metal plate body 11 during the lowering movement of the upper die 22 from the first predetermined position to the second predetermined position.

When the upper die 22 is further lowered from the state where the formed section 22a is in contact with the metal plate body 11, it starts to be inserted into the hollow section 21a of the lower die 21 while pressedly deforming the metal plate body 11. It is to be noted that the outer peripheral size of the upper die 22 is smaller than the opening size of the hollow section 21a by an amount not more than the thickness of the metal plate body 11. Therefore, the metal plate body 11 is not cut by being clamped between the upper die 22 and the support section 21b when the upper die 22 is inserted into the hollow section 21a.

Figure 7:
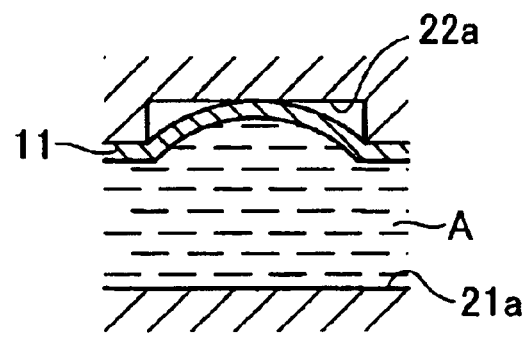
FIG. 7 is an explanatory view for explaining a convex shape formed on a metal plate body at the third step shown in FIG. 3.

When the upper die 22 starts to insert into the hollow section 21a while pressedly deforming the metal plate body 11 as described above, the hydraulic fluid A in the sealed space is started to be compressed. This pressurizes the hydraulic fluid A, so that the fluid pressure of the hydraulic fluid A increases in proportion to the slide amount of the upper die 22 as shown by a broken line in FIG. 6. When the fluid pressure of the hydraulic fluid A increases in this way, the metal plate body 11 is deformed such that the front surface thereof is pressedly deformed into an concave shape by the convex section of the formed section 22a and the back surface thereof is deformed into a convex shape by being pressed toward the concave section of the formed section 22a due to the increased fluid pressure of the hydraulic fluid A as shown in FIG. 7.

Figure 8:
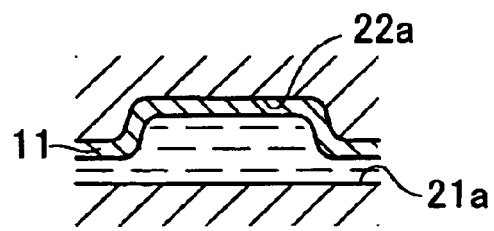
FIG. 8 is an explanatory view for explaining a rib-like convex section formed on the metal plate body at the third step shown in FIG. 3.
Figure 9:
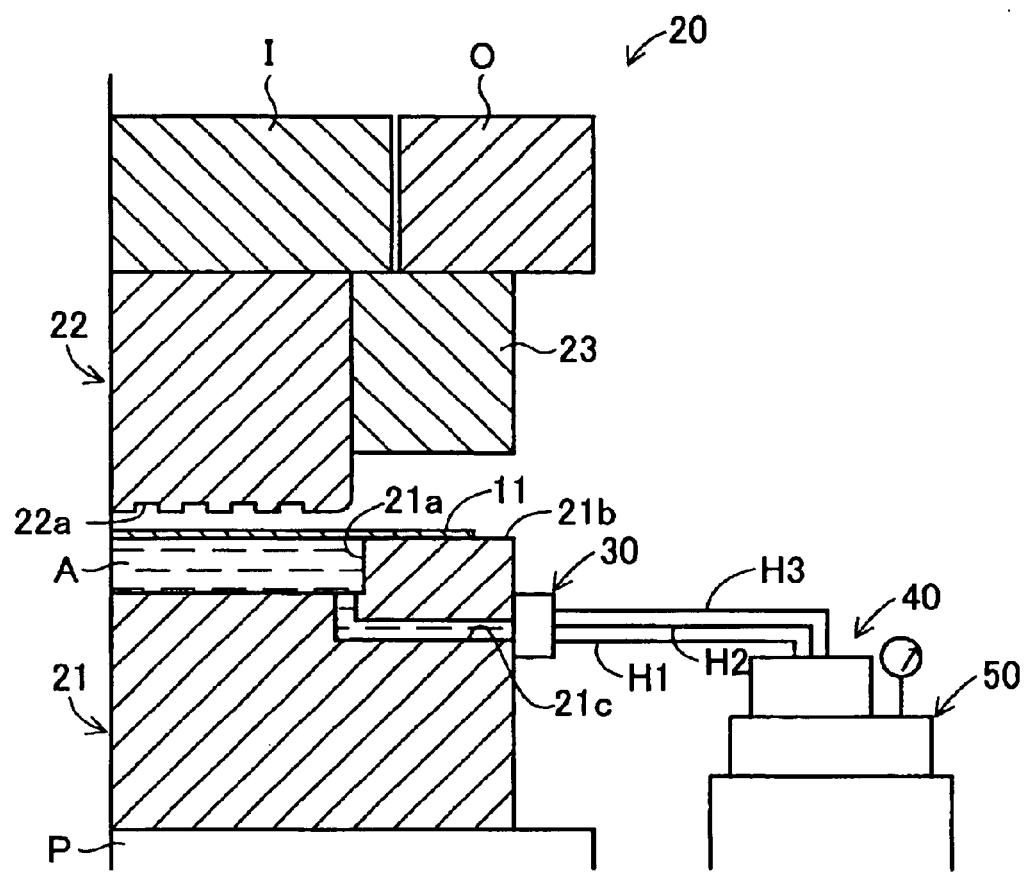
FIG. 9 is a schematic view schematically showing a hydraulic forming device according to a second embodiment of the present invention.

When the upper die 22 is lowered to the second predetermined position, the metal plate body 11 is further pressedly deformed to further compress the hydraulic fluid A, thereby further increasing the fluid pressure. The fluid pressure at this time rises to approximately 300 to 400 MPa. When the upper die 22 is lowered to the second predetermined position to thereby increase the fluid pressure of the hydraulic fluid A in this way, the concave section of the formed section 22a is transferred onto the surface of the metal plate body 11, i.e., the rib-like convex section 12 is exactly formed on the surface of the metal plate body 11 as shown in FIG. 8.

Figure 4:
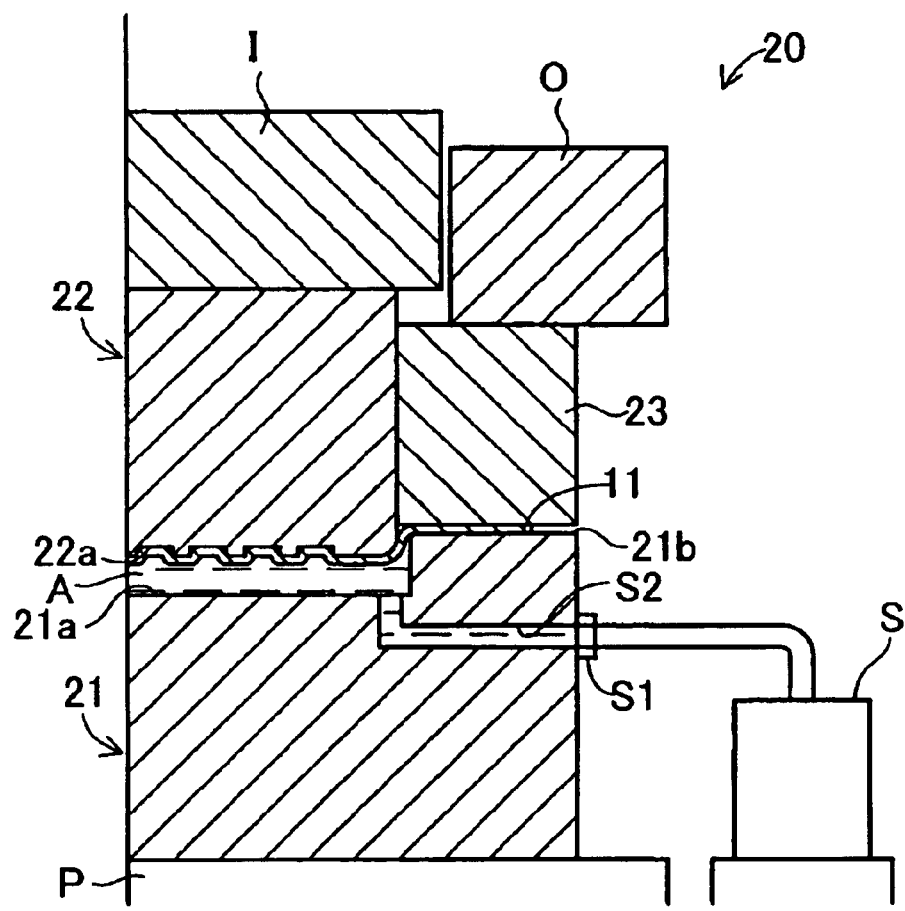
FIG. 4 is a schematic view for explaining a fourth step executed by the hydraulic forming device according to a first embodiment of the present invention.

At the fourth step shown in FIG. 4, the upper die 22 is held at the second predetermined position and the increased fluid pressure of the hydraulic fluid A is kept for a predetermined time (for example, 0.5 second) after the rib-like convex section 12 is transferred onto the metal plate body 11 at the third step. Force produced by the high fluid pressure is uniformly exerted on the entire back surface of the metal plate body 11 for the predetermined time, whereby a distortion caused by a partial expansion or contraction can be eliminated. Further, exerting too the force produced by the high fluid pressure for the predetermined time on the rib-like convex section 12 on the metal plate body 11 enables to transfer more exactly the concave section of the formed section 22a.

After the predetermined time has elapsed, the on-off valve S1 is opened to release the fluid pressure of the hydraulic fluid A to thereby lower the hydraulic fluid A, and then, the inner slider I rises in the axial direction to raise the upper die 22. Subsequently, the outer slider O rises in the axial direction to perform the fifth step for raising the blank holder 23. By this, the metal separator 10 having a great number of rib-like convex sections 12 formed on the metal plate body 11 can be removed to complete the hydraulic forming. As described above, the metal separator 10 is completed by going through the first step to fifth step (one cycle). Unless the hollow section 21a is filled with the hydraulic fluid A up to its top surface, the fluid replenishing device S is driven as well as the on-off valve S1 is opened for replenishing the hydraulic fluid A. When the hollow section 21a is filled with the hydraulic fluid A up to its top surface, the fluid replenishing device S is stopped and the on-off-valve S1 is closed.

As understood from the aforesaid explanation, the metal separator 10 can be formed by successively performing the first step to the fifth step with the hydraulic forming device 20. Specifically, the upper die 22 is lowered relative to the lower die 21, thereby pressedly deforming the metal plate body 11 placed on the support section 21b of the lower die 21. This compresses the hydraulic fluid A filled in the hollow section 21a of the lower die 21 to increase the fluid pressure. The formed section 22 formed on the upper die 22 and the hydraulic fluid A having the increased fluid pressure can form a great number of rib-like convex sections 12 on the metal plate body 11. Therefore, a process for increasing and reducing pressure of the hydraulic fluid A and a pressing process with the lower die 21 and the upper die 22 can be eliminated, and further, up-down stroke of the upper die 22 can be reduced to an amount of approximately the height of the rib-like convex section 12. Accordingly, a time required for processing the metal separator 10 can be shortened.

Additionally, the fluid pressure of the hydraulic fluid A can be maintained for the predetermined time after forming a great number of rib-like convex sections 12. As a result, high fluid pressure can uniformly be exerted on the bottom surface of the metal plate body 11, thereby being capable of eliminating the distortion caused with the forming, for example. Therefore, a process for eliminating the distortion can be omitted, thereby being capable of shortening the time required for processing. Further, the fluid pressure of the hydraulic fluid A can be released after the predetermined time has elapsed. This can prevent the rib-like convex section 12 on the metal separator 10 from being deformed due to the high fluid pressure exerted on the bottom surface of the metal plate body 11 after the upper die 22 rises.

Moreover, the back surface of the metal plate body 11 only comes into contact with the hydraulic fluid A, thereby, for example, being capable of preventing the metal plate body from being damaged by the contact with the die. Further, the back surface of the metal plate body 11 is formed by coming into contact with the hydraulic fluid A, so that a processing force is uniformly exerted on the formed section. By this, the expansion of the metal plate body 11 can be increased, whereby the forming can be facilitated even if the metal plate body is a thin plate having a thickness of not more than 1 mm, for example.

Further, the fluid pressure of the hydraulic fluid A can be efficiently increased without additionally providing a pressure pump, thereby being capable of facilitating the forming. Therefore, the construction of the hydraulic forming device 20 can be simplified, to thereby be capable of reducing a manufacturing cost of the hydraulic forming device 20. Even if the fluid pressure of the hydraulic fluid A is increased to be high, the forming can be performed with the hydraulic fluid A prevented from being leaked from between the metal plate body 11 and the support section 21*b*, whereby the fluid pressure of the hydraulic fluid A can be increased. This enables to exactly transfer the shape of the formed section 22*a* of the upper die 22, thereby being capable of enhancing the forming precision.

Further, the hydraulic fluid A can be prepared by mixing glycol and water that are easily got. According to this, fluid having low compression and high viscosity can be prepared with extreme ease. Moreover, the hydraulic forming device 20 can be provided with the fluid replenishing device S for replenishing the hydraulic fluid A filled in the hollow section 21*a* of the lower die 21. Therefore, the hydraulic fluid A can easily be replenished even if the hydraulic fluid A is decreased due to, for example, the continuous forming.

In the above-mentioned first embodiment, the on-off operation of the on-off valve S1 causes to replenish the hydraulic fluid A to the hollow section 21*a* from the fluid replenishing device S or causes to release the fluid pressure of the hydraulic fluid A to lower the same. Instead of the on-off valve S1 and the fluid replenishing device S, a composite valve 30 can be installed to the lower die 21 and a control valve unit 40 and pump unit 50 are connected to the composite valve 30 via pipe lines H1, H2 and H3 for executing the operation. This second embodiment will be explained in detail hereinbelow, wherein components same as the above-mentioned first embodiment are given by the same numerals for omitting the detailed explanation thereof.

A composite valve 30, control valve unit 40 and pump unit 50 are components of a supplying/exhausting/sealing device that can supply the hydraulic fluid A for filling the hollow section 21*a* of the lower die 21 with the hydraulic fluid A before the metal plate body 11 is placed on the support section 21*b* of the lower die 21, can seal the hydraulic fluid A filled in the hollow section 21*a* when the metal plate body 11 is formed by the upper die 22 and the lower die 21, and can exhaust the hydraulic fluid A from the hollow section 21*a* before the upper die 22 is withdrawn from the lower die 21 after the forming.

Figure 10:
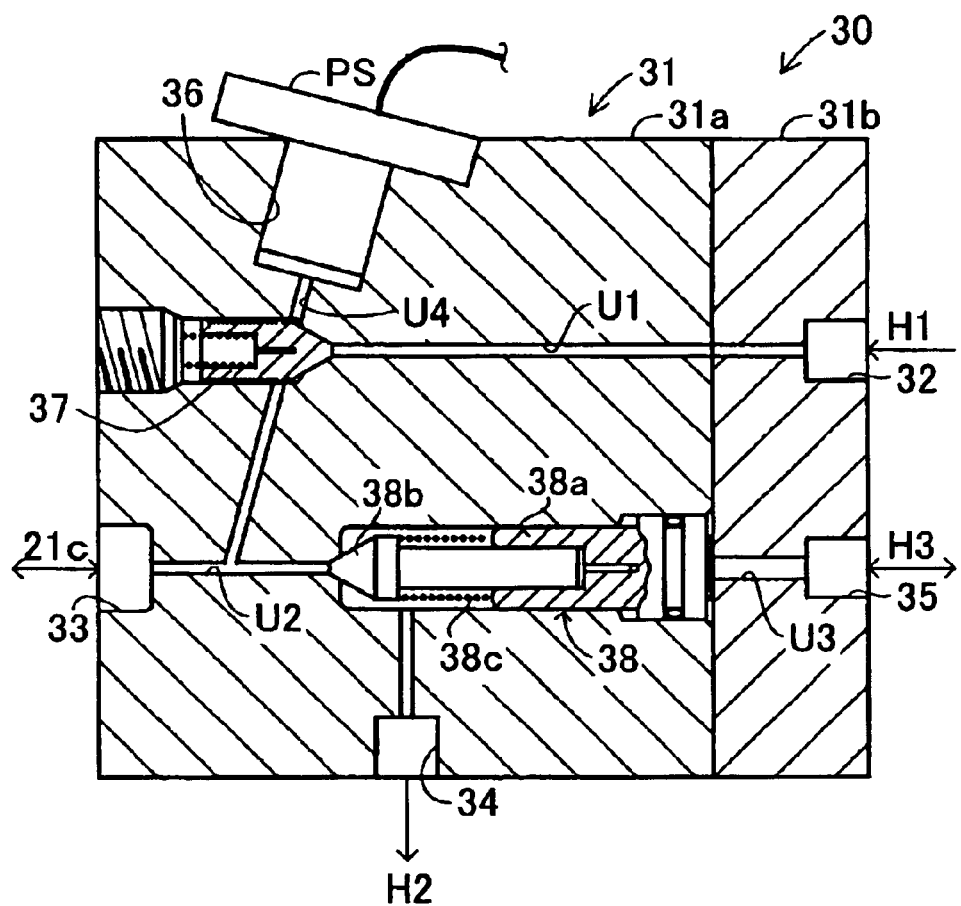
FIG. 10 is a schematic view for explaining a construction of a composite valve assembled to the hydraulic forming device according to the second embodiment of the present invention.
Figure 11:
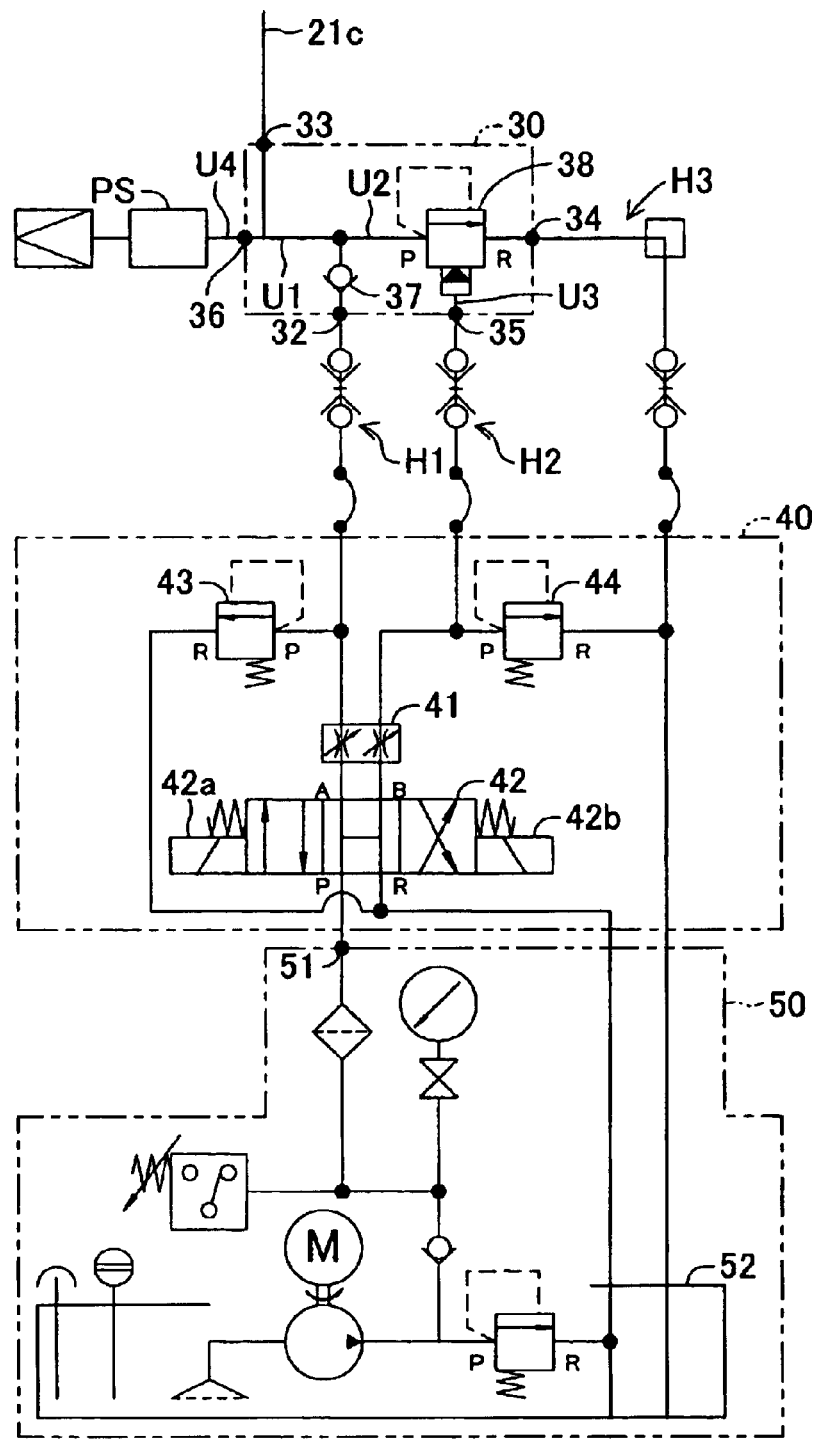
FIG. 11 is a hydraulic circuit diagram showing the composite valve, control valve unit and pump unit shown in FIG. 9.

The composite valve 30 is provided by combining a check valve 37 and a pilot-type relief valve 38 as shown in FIG. 10 and FIG. 11 and has a valve body 31, a supply port 32, a supply/exhaust port 33, an exhaust port 34, a pilot port 35 and a sensor-mounted port 36, these ports being provided at the valve body 31, and communicating paths U1, U2 and U3 that establish a communication among these ports.

The valve body 31 is composed of a main body section 31*a* and a cover section 31*b* made of a block material such as carbon steel for machine construction. The valve body 31 is formed into a flat shape having each port 32, 33, 34, 35 and 36 and communicating paths U1, U2, U3 and U4 formed on the same surface when the main body section 31*a* and the cover section 31*b* are put together.

The supply port 32 is formed on the cover section 31*b* of the valve body 31 and connected to the pipe line H1 and a variable throttle 41 and an A-port of a four-port three-position switching type solenoid-operated valve 42, both being provided at the control valve unit 40, for supplying the hydraulic fluid A. The pipe line H1 is formed by a high pressure rubber hose and a coupler. The supply/exhaust port 33 is formed on the main body section 31*a* of the valve body 31 and is directly connected to a path 21*c* formed at the lower die 21 of the hydraulic forming device 20 and open to the bottom section of the hollow section 21*a* for supplying the hydraulic fluid A to the hollow section 21*a* and exhausting the hydraulic fluid A therefrom. The supply port 32 and the supply/exhaust port 33 are connected to each other via the communicating path U1.

The exhaust port 34 is formed on the main body section 31*a* of the valve body 31 and is connected to a tank 52 provided at the pump unit 50 via the pipe line H2 for flowing the hydraulic fluid A discharged from the hollow section 21*a* to the tank 52. The exhaust port 34 is connected to the supply/exhaust port 33 via the communicating path U2. It is to be noted that the pipe line H2 is made of a high pressure rubber hose and a coupler.

The pilot port 35 is formed on the cover section 31*b* of the valve body 31 and is connected to the pipe line H3 and the variable throttle 41 and a B-port of the four-port three-position switching type solenoid-operated valve 42, both being provided at the control valve unit 40, for supplying a pilot pressure to the pilot-type relief valve 38 via the communicating path U3. It is to be noted that the pipe line H3 is made of a high pressure rubber hose and a coupler.

The sensor-mounted port 36 is a port to which a pressure sensor PS is installed. The sensor-mounted port 36 is connected to the supply/exhaust port 33 via a communicating path U4 that is connected to the communicating path U1. Unless the pressure sensor PS is installed to the sensor-mounted port 36, a plug is mounted to the sensor-mounted port 36.

The check valve 37 is provided halfway at the communicating path U1 that connects the supply port 32 and the supply/exhaust port 33. When the hydraulic fluid A is introduced into the communicating path U1 via the supply port 32, the check valve 37 allows the flow of the hydraulic fluid A to the supply/exhaust port 33. On the other hand, the check valve 37 hinders the flow of the hydraulic fluid A from the supply/exhaust port 33 to the supply port 32.

The pilot-type relief valve 38 is provided halfway at the communicating path U2 that connects the supply/exhaust port 33 and the exhaust port 34. This pilot-type relief valve 38 is provided with the pilot port 35 and a piston 38a that receives the pilot pressure transmitted through the communicating path U3. A poppet valve 38b is installed to the piston 38a so as to be slidable in the axial direction of the piston 38a. A valve section of the poppet valve 38b is urged toward the valve seat by the urging force of a spring 38c mounted between the piston 38a and the poppet valve 38b.

The relief pressure of the pilot-type relief valve 38 is set to a high value depending upon the switching operation of the four-port three-position switching type solenoid-operated valve 42 provided at the control valve unit 40 with the pilot pressure transmitted from the pump unit 50 via the pilot port 35. On the other hand, the relief pressure is set to a low value depending upon the switching operation of the four-port three-position switching type solenoid-operated valve 42 with the pilot pressure not transmitted from the pump unit 50 via the pilot port 35.

The pressure sensor PS detects the fluid pressure of the hydraulic fluid A in the hollow section 21a transmitted via the path 21c and the communicating path U4. The value detected by the pressure sensor PS is outputted to, for example, a personal computer not shown via an amplifier.

The control valve unit 40 has the variable throttle 41, four-port three-position switching type solenoid-operated valve 42 and relief valves 43 and 44 as shown in FIG. 11. The variable throttle 41 is a needle valve for adjusting the flow amount of the hydraulic fluid A supplied respectively to the supply port 32 and the pilot port 35 of the composite valve 30.

The four-port three-position switching type solenoid-operated valve 42 (hereinafter referred to as solenoid-operated change-over valve 42) has a pair of solenoids 42a at the left side and 42b at the right side. A P-port of the solenoid-operated change-over valve 42 is connected to an output port 51 of the pump unit 50, while an R-port is connected to the tank 52 of the pump unit 50. The solenoid-operated change-over valve 42 is controlled by an electric control device not shown so as to control the operations of the solenoids 42a and 42b, thereby changing over the flow path of the hydraulic fluid A. The electric control device controls the operations of the solenoids 42a and 42b according to the detected result, for example, of a sensor that detects the upward and downward positions of the upper die 22 or the blank holder 23 or a sensor that detects the fluid level of the hydraulic fluid A in the hollow section 21a.

The control of the solenoid-operated change-over valve 42 by this electric control device will specifically be explained. The electric control device brings the solenoids 42a and 42b into a deenergized state in the above-mentioned first and second steps. This operation locates the position of the valve body of the solenoid-operated change-over valve 42 at the central position (the state shown in FIG. 11), thereby establishing a communication among all the A-, B-, P- and R-ports. Further, the electric control device energizes the solenoid 42b at the aforesaid third and fourth steps. By this operation, the position of the valve body of the solenoid-operated change-over valve 42 is changed to the position (hereinafter referred to as a pilot position) for communicating the output port 51 of the pump unit 50 with the pilot port 35 via the P-and B-ports of the solenoid-operated change-over valve 42 and for communicating the tank 52 with the supply port 32 via the R- and A-ports of the solenoid-operated change-over valve 42. The pilot pressure is transmitted to the pilot-type relief valve 38 by this change.

Moreover, the electric control device brings the solenoids 42a and 42b into a deenergized state in the process from the aforesaid fourth step to the beginning of the fifth step. This operation locates the position of the valve body of the solenoid-operated change-over valve 42 at the central position, thereby establishing a communication among all the A-, B-, P- and R-ports, so that the hydraulic fluid A is discharged from the hollow section 21a. Further, the electric control device energizes the solenoid 42a according to the detected result of the fluid level of the hydraulic fluid A in the hollow section 21a at the process from the above-mentioned fifth step to the first step. By this operation, the position of the valve body of the solenoid-operated change-over valve 42 is changed to the position (hereinafter referred to as a supply position) for communicating the output port 51 of the pump unit 50 with the supply port 32 via the P- and A-ports of the solenoid-operated change-over valve 42 and for communicating the tank 52 with the pilot port 35 via the R- and B-ports of the solenoid-operated change-over valve 42. The hydraulic fluid A is supplied to the hollow section 21 from the pump unit 50 by this change.

The relief valve 43 performs a relief operation when the fluid pressure of the hydraulic fluid A supplied to the supply port exceeds a predetermined pressure, thereby flowing (discharging) the hydraulic fluid A into the tank 52 of the pump unit 50. The relief valve 44 performs a relief operation when the fluid pressure of the hydraulic fluid A supplied to the pilot port exceeds a predetermined pressure, thereby flowing (discharging) the hydraulic fluid A into the tank 52 of the pump unit 50.

The pump unit 50 discharges the hydraulic fluid A filled in the tank 52 from the output port 51 at a predetermined fluid pressure. By this operation, the pump unit 50 supplies the hydraulic fluid A discharged from the output port 51 to the hollow section 21a of the hydraulic forming device 20 or transmits the same to the pilot-type relief valve 38 of the composite valve 30 at a predetermined pilot pressure.

In the composite valve 30 having the above-mentioned construction, the relief pressure of the pilot-type relief valve 38 is set to a low pressure value since the position of the valve body of the solenoid-operated change-over valve 42 is changed to the central position in the aforesaid first and second steps, whereby the hydraulic fluid A is sealed in a space formed by the bottom surface of the metal plate body 11, hollow section 21a, path 21c and composite valve 30. In case where the hydraulic fluid A is required to be replenished before the metal plate body 11 is placed on the support section 21b at the first step, the position of the valve body of the solenoid-operated change-over valve 42 is temporarily changed to the supply position. This change can replenish the hydraulic fluid A from the pump unit 50 to the hollow section 21a as shown in FIG. 12C. After the hydraulic fluid A is replenished, the position of the valve body of the solenoid-operated change-over valve 42 is changed to the central position.

Figure 12A:
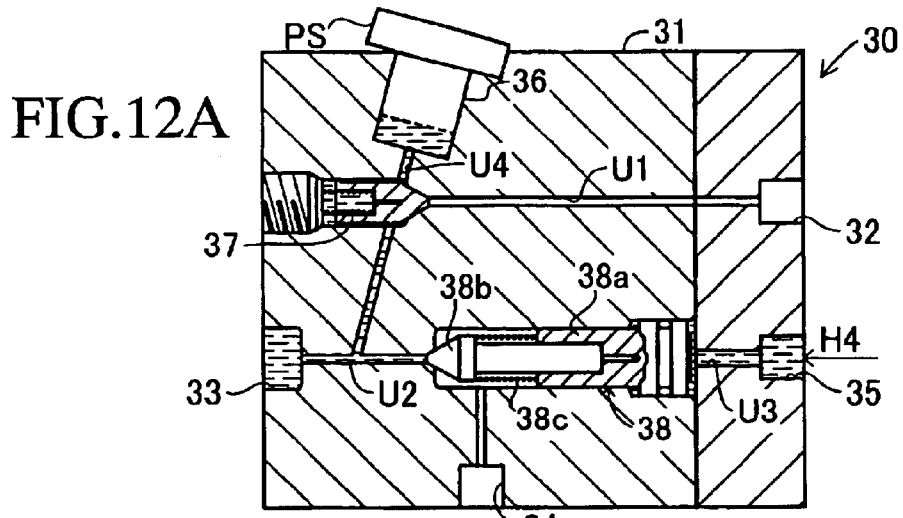
FIG. 12 is an explanatory schematic view for explaining the operation of the composite valve shown in FIG. 9.
Figure 12B:
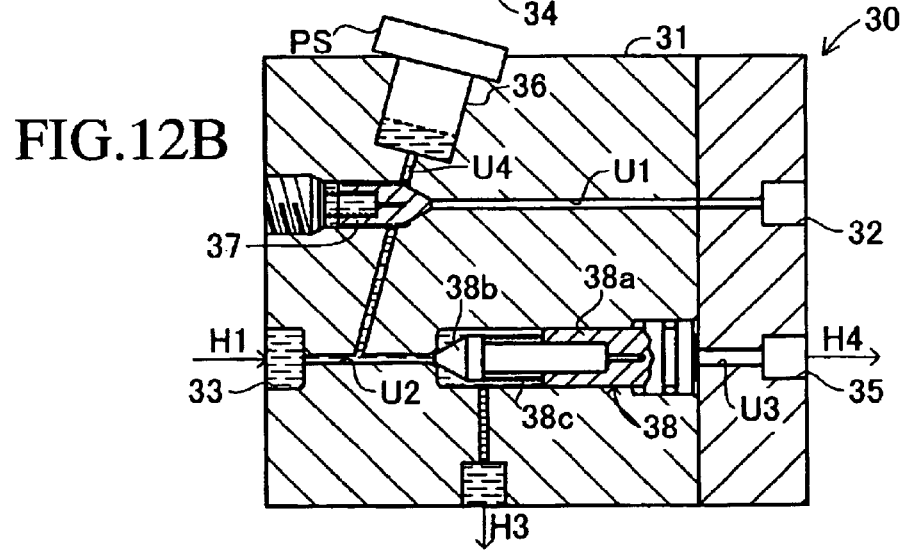
Figure 12C:
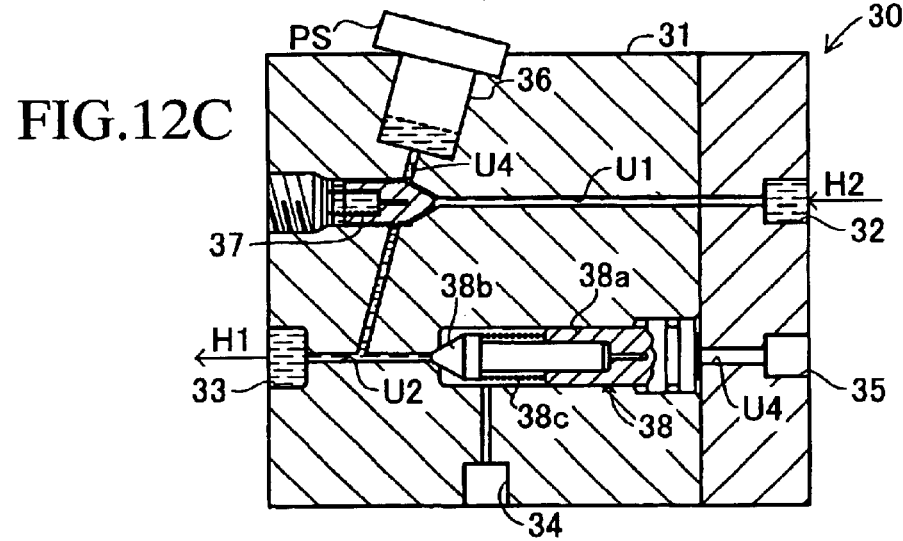

Further, in the composite valve 30, the check valve 37 and the pilot-type relief valve 38 inhibit the flow of the hydraulic fluid A as shown in FIG. 12A since the position of the valve body of the solenoid-operated change-over valve 42 is changed to the pilot position in the aforesaid third and fourth steps. At this time, the relief pressure of the pilot-type relief valve 38 is set to a high pressure value. Further, in the composite valve 30, the position of the valve body of the solenoid-operated change-over valve 42 is changed to the central position at the beginning period when the process is changed from the fourth step to the fifth step, whereby the hydraulic fluid A is discharged to the tank 52 of the pump unit 50 via the pipe line H2 as shown in FIG. 12B. Accordingly, the fluid pressure in the hollow section 21a is released.

Moreover, in case where the hydraulic fluid A is required to be replenished after the metal separator 10 is removed at the fifth step, the position of the valve body of the solenoid-operated change-over valve 42 is changed to the supply position. The composite valve 30 allows the flow from the supply port 32 to the supply/exhaust port 33 as shown in FIG. 12C. This can replenish the hydraulic fluid A supplied from the pump unit 50 to the hollow section 21a via the path 21c.

As described above, the same effect as the above-mentioned first embodiment can be obtained by the second embodiment that adopts the composite valve 30, control valve unit 40 and the pump unit 50 instead of the on-off valve S1 and the fluid replenishing device S. Further, the valve body 31 of the composite valve 30 provided with the check valve 37 and the pilot-type relief valve 38 is directly installed to the lower die 21, whereby it is unnecessary to provide a communicating pipe line for establishing communication between the hollow section 21a of the lower die 21 and each valve 37 and 38. Therefore, pressure drop due to the enlarged diameter of the communicating pipe line does not occur when the fluid pressure of the hydraulic fluid A is set high, thereby being capable of maintaining the fluid pressure of the hydraulic fluid A high. Moreover, a pressure drop due to the communicating pipe line is not produced to thereby extremely easily increase the fluid pressure even if the compression of the hydraulic fluid A is small, resulting in being capable of decreasing the stroke amount of the upper die 22. Additionally, spaces for respectively installing the check valve 37 and the pilot-type relief valve 38 can be saved, so that the hydraulic forming device 20 can be made compact.

In this second embodiment, the pressure sensor PS can be mounted to the sensor-mounted port 36, so that, when the pressure sensor PS is mounted, the detected value outputted from the sensor PS can be displayed on a display device of a personal computer not shown as the fluid pressure in the hollow section 21a. An operator who monitors the operation state of the hydraulic forming device 20 can confirm whether the fluid pressure in the hollow section 21a rises to the predetermined pressure or not by this display, which means that he/she can confirm whether the metal separator 10 is formed under a predetermined forming condition or not.

Therefore, whether the forming state of a product is good or not can be checked based upon the fluid pressure of the hydraulic fluid A outputted from the pressure sensor PS, thereby being capable of keeping the quality of the product satisfactory. Further, the operation amount of the hydraulic forming device 20, i.e., the operation amount of the upper die 22 getting into the hollow section 21a of the lower die 21 can also suitably be adjusted based upon the fluid pressure of the hydraulic fluid A outputted from the pressure sensor PS. This enables to form the metal plate body 11 with the effect (for example, variation in the thickness or the like) of the shape of the metal plate body 11 made minimum, thereby being capable of keeping the quality of the product satisfactory.

In the above-mentioned each embodiment, the metal separator 10 is selected to be a subject to be formed to have a great number of rib-like convex sections 12, but it is needless to say that the present invention is applicable for executing to form a great number of convex sections on the other thin metal plate.

Moreover, the aforesaid each embodiment is executed wherein the workpiece is the plate-like metal plate body 11, the lower die 21 is a fixed type and the upper die 22 is a movable type. Specifically, the hydraulic fluid A is sealedly filled below the metal plate body 11 interposed between the upper die 22 and the lower die 21 and the hydraulic fluid A is pressurized by pressing down the upper die 22 toward the hollow section 21a of the lower die 21, whereby a part of the metal plate body 11 is deformed toward the formed section 22a formed above the metal plate body 11 to thereby perform a forming on the metal plate body.

However, it is possible that a cylindrical workpiece is used and the hydraulic fluid A is filled in this cylindrical workpiece for performing the forming. Specifically, the hydraulic fluid A is sealedly filled in the cylindrical workpiece interposed between the movable die and the fixed die, whereupon the movable die is pushed down toward the accommodating section in the axial direction of the workpiece. By this, the movable die pushes the workpiece toward the axial direction to thereby deform the same and compresses the hydraulic fluid A accommodated in the workpiece to thereby pressurize the hydraulic fluid A. Then, the hydraulic fluid A having the increased pressure deforms a part of the workpiece toward a formed space section formed on the fixed die arranged at the outside of the workpiece, whereby the workpiece is formed.

According to this construction, the hydraulic fluid A can be pressurized by pushing down the movable die toward the accommodating section of the hydraulic fluid A. Therefore, it is unnecessary to provide a pressure pump for pressurizing the hydraulic fluid A, thereby simplifying the die construction.

What is claimed is:

1. A hydraulic forming process a workpiece using a movable die having a forming section and a fixed die having an accommodating section for fluid, comprising:
    filling the accommodating section with fluid wherein the compression ratio of the fluid is not more than $3.0 \times 10^{-5}$ cm2/kg;
    sealing the fluid in the accommodating section by one side of the workpiece;
    pressing down the movable die toward the accommodating section of the fluid to increase the pressure of the fluid; and
    deforming a part of the workpiece toward a forming space section formed by the forming section of the movable die and the other side of the workpiece.

2. A hydraulic forming process claimed in claim 1, wherein the viscosity of the fluid is between 100 to 1500 cSt.

3. A hydraulic forming process claimed in claim 1, wherein the fluid is a mixture of glycol and water at a predetermined ratio.

4. A hydraulic forming process claimed in claim 3, wherein the mixed volume ratio of the glycol to water is 9-6 to 1-4.

5. A hydraulic forming process claimed in claim 1, wherein the workpiece is formed such that one side thereof is surface-treated and said one side comes in contact with the fluid.

6. A hydraulic forming device comprising;
    a lower die having a support section that supports a workpiece placed thereon and a hollow section enclosed by the support section and filled with fluid;
    a blank holder that is movable upwardly and downwardly and has a structure to clamp a peripheral edge section of the workpiece with the support section of the lower die;
    an upper die that is movable upwardly and downwardly, has a formed section at its bottom surface and fits into the hollow section of the lower die with the central section of the workpiece having the peripheral edge section clamped by the support section of the lower die and the blank holder;

a valve body installed directly to the lower die;

a check valve installed to the valve body, wherein the check valve allows the flow of the fluid from a hydraulic supply source to the hollow section of the lower die while the check valve seals the fluid filled in the hollow section when the workpice is formed by the upper die and the lower die; and a relief valve installed to the valve body, wherein the relief valve is capable of changing a fluid pressure retainable in a path between the hollow section of the lower die and the check valve according to a changeover operation of a relief pressure, the relief valve seals the fluid filled in the hollow section by increasing a relief pressure when the workpiece is formed by the upper die and the lower die, and the relief valve discharges the fluid from the hollow section by decreasing a relief pressure before the upper die is withdrawn from the hollow section of the lower die, after the forming.

7. A hydraulic forming device claimed in claim 6, wherein the valve body is provided with a mounting port to which a pressure sensor can be mounted.

8. A hydraulic forming device claimed in claim 6, wherein the workpiece has one surface having a surface treatment performed thereon and is placed on the support section of the lower die with said one surface brought into contact with the fluid.

* * * * *